US006873661B1

(12) United States Patent
Ben-Eli (10) Patent No.: US 6,873,661 B1
(45) Date of Patent: Mar. 29, 2005

(54) π/4 QPSK MODULATOR (75) Inventor: David Ben-Eli, Modiin (IL)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 09/694,806

(22) Filed: Oct. 23, 2000

Related U.S. Application Data (63) Continuation-in-part of application No. PCT/IL99/00047, filed on Jan. 25, 1999.

(30) Foreign Application Priority Data

Apr. 23, 1998 (IL) .............................................. 124187

(51) Int. Cl.[7] .............................................. H04L 27/20
(52) U.S. Cl. ..................................................... 375/308
(58) Field of Search ................................ 375/279, 281, 375/284, 308, 298, 280, 296, 297; 332/103; 708/603, 319; 702/58; 711/109; 804/1.22

(56) References Cited

U.S. PATENT DOCUMENTS

| | | | | |
|---|---|---|---|---|
| 4,573,136 A | * | 2/1986 | Rossiter ...................... | 708/603 |
| 4,713,997 A | * | 12/1987 | Deutsch ...................... | 84/605 |
| 5,487,089 A | * | 1/1996 | Misaizu et al. ............. | 375/296 |
| 5,500,811 A | * | 3/1996 | Corry .......................... | 708/319 |
| 5,544,077 A | * | 8/1996 | Hershey ...................... | 702/58 |
| 5,548,775 A | * | 8/1996 | Hershey ...................... | 711/109 |
| 5,586,266 A | * | 12/1996 | Hershey et al. ............. | 702/182 |
| 5,633,893 A | * | 5/1997 | Lampe et al. ................ | 375/297 |

FOREIGN PATENT DOCUMENTS

EP 0620667 10/1994

OTHER PUBLICATIONS

Tetsu Sakata et al., A New Fully– Digitalized Pi/4–Shift QPSK Modulator for Personal Communication Terminals, 1993, IEEE, pp. 926–930.*

Tetsu Sakata et al., A New Fully– Digitalized Pi/4–Shift QPSK Modulator for Personal Communication Terminals, 1994, IEICE Transactions on Communications, vol. E77–B, pp. 921–926.*

Sakata et al. "A New Fully–Digitalized PI/4–Shift QPSK Modulator for Personal Communication Terminals" IEICE Transactions on Communications, vol. E77–B, No. 7, Jul. 1, 1994, pp. 921–926, XP000471322, Tokyo, Japan.

Sakata et al. "A New Fully–Digitalized PI/4–Shift QPSK Modulator for Personal Communication Terminals" IEICE Transactions on Communications, vol. E77–B, No. 7, Jul. 1, 1994, pp. 926–930, XP000471322, Tokyo, Japan.

* cited by examiner

*Primary Examiner*—Don N. Vo
(74) *Attorney, Agent, or Firm*—Eitan, Pearl, Latzer & Cohen Zedek, LLP (57) ABSTRACT

A method of π/4-shift QPSK modulation and π/4-shift QPSK modulator are provided. The modulator address symbols from a Precursor section of a register to a first memory portion and from a Postcursor section of the register to a second memory portion at odd times and, address symbols from the Precursor section to said second memory portion and from said Postcursor section to said first memory portion at even times. The modulator uses reversed addressing for Postcursor symbols in accessing the said first and second memory portions.

20 Claims, 7 Drawing Sheets

π/4 QPSK MODULATOR

This is a continuation-in-part of copending International application No. PCT/IL99/00047 filed Jan. 25, 1999, which is incorporated by reference herein.

FIELD OF THE INVENTION

The invention relates to a π/4 shift QPSK modulator for outputting a modulated signal in accordance with inputted digital data bits to use in communications systems, and which is designed for low power consumption and small area.

BACKGROUND OF THE INVENTION

Figure 1:
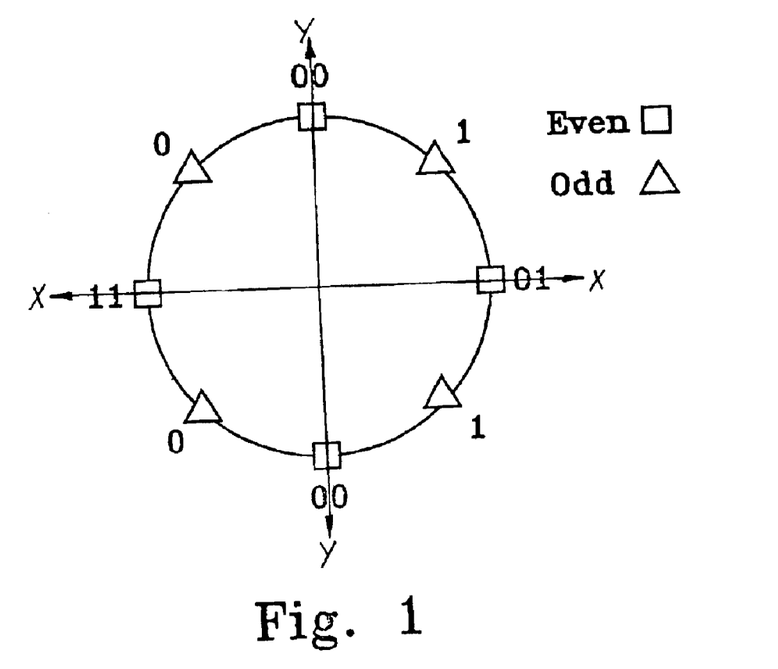
FIG. 1 schematically illustrates the position of the signals in the orthogonal coordinate system.

In digital communication systems, a modulator is often used to convert data to analog signals, which can be transmitted e.g. as radio signals or over a telephone line. They functionally operate to shape a data signal and combine the shaped signal with a carrier to provide a modulated data bearing signal. In some applications the shaping function is provided by a FIR (Finite Impulse Response) filter and the resulting shaping is determined by the transfer function of the FIR. The transfer function of the FIR is embodied in an array of coefficients that are to be applied to the inputted data.

π/4-shift QPSK modulators are known in the art and are used in digital communications systems. In the quaternary phase modulation, the signal transmitted in a time interval can be written as $s(t)=A\cos(2\pi f_c t+\theta_k+\phi)$, where $\theta_k$ denotes the message to be sent in said interval, $\phi$ is the carrier phase when t=0 and in the absence of any phase modulation, and $\theta_k$ has eight different values, four at odd times and four at even times, as shown in FIG. 1. In said modulators, the modulated baseband—which, in exponential form, can be written as $s(t)=e^{j(\theta_k+\phi)}$ is inputted to a lowpass shaping filter, usually having a symmetric response and typically realized by an FIR digital filter.

In some prior art apparatus, the FIR comprises memory means in which are stored the coefficients $a_j$ for each input signal that is received. For each signal, the corresponding coefficients are retrieved from the memory. The sum-of-products defined by the following formula (1) is then calculated, and all the sums-of-products are added to provide an output. The output can then be converted from digital to analog, as required. Such an apparatus, however, would have to carry out many operations in each unit of time and therefore would have to operate very rapidly.

In the FIR digital filter, the input signal is convoluted with the coefficients which define the filter transfer function. For this purpose, each of the inputs has to be multiplied by a respective coefficient, and the resulting sub-products are to be added together to give an output. The resulting sum-of-products can therefore be expressed as:

$$V_i = \sum_{j=0}^{n-1} a_j u_{i-j} \quad (1)$$

where $V_i$ is the sum-of-products, i is the time index, $u_j$ are the inputs, $a_j$ are the said coefficients, and j is an integer number which has the values 0 to n−1, wherein n is the number of coefficients.

A sum-of-products multiplier, which performs said operation, is known in the art. Some of them use lookup table means to perform equation (1). However, the number of bits per symbol used as an addressing to the table is constant. This solution is simple, but leads to big tables which is significantly reduced by the current invention.

A better solution, to which this invention generally refers, is to provide memory means or Look-Up Tables (LUT) which store the values of the $V_i$. The access to the table at any given time is made to an address which is a combination of all the symbol values being in a FIFO register at that particular time. FIG. 1 illustrates the typical case in which the I-channel and the Q-channel inputs to the filter have five possible values: ±1, ±0.707, and 0, as read on the x-axis of the figure. As seen in FIG. 1, there are four signals at odd times and four at even times. The numbers in FIG. 1 are examples to the I-channel input values resulting from the π/4 shifted QPSK signal, the Q-channel input will be phase-shifted by π/2. A memory or LUT required for storing the sums of the products $V_i$ of the input signals for the respective coefficients defining the filter transfer function, has a considerable size. Thus, for example, employing 3 bits to represent said five possible values and for a 6-symbols filter span, and four samples per symbol, the size of memory required is $2^{3\times 6}\times 4=1$ M. Of course, the above numbers are only examples intended to illustrate a general phenomenon that is not limited by them. Note that the conventional QPSK case is much easier for handling, since the I signal and the Q signal can each obtain only two values, and thus one bit is sufficient to represent each value.

Efforts have been made in the art to reduce the size of this memory. Thus, Tetsu Sakata et al., "A New Fully-Digitalized π/4-Shift QPSK modulator for Personal Communication Terminals", IEEE, ICUPC 1993, pp. 926–930 propose a reduction of the size of the memory, based on the following considerations. Eight transmission signal points are to be expressed on the orthogonal coordinates system. The π/4-shift QPSK modulation scheme, as shown in FIG. 1, has four transmission signal points at even times (indicated by squares) and four at odd times (indicated by triangles). The I,Q inputs to the filter, transmitted at even times, have 3 possible values (+1,−1,0) and therefore their amplitude values are described by two bit combinations both in the I-channel and in the Q-channel data. However, the symbols transmitted at odd times have only two possible values (+0.707,−0.707) and a single amplitude, and therefore their amplitude values are described by single bits both in the I-channel and in the Q-channel data. The resulting representation, by two bits and one bit respectively, with reference (as has been noted) to the I-channel is shown in FIG. 1. Correspondingly, two bits are transmitted on the I-channel and the Q-channel at even times and only one bit is transmitted on both channels at odd times. Since, the transmission times shown in FIG. 1 are cyclic, the even times and odd times addresses are, for example:

odd time:

| n+5 | n+4 | n+3 | n+2 | n+1 | n |
|---|---|---|---|---|---|
| 1 | 00 | 0 | 01 | 1 | 11 | even time:

| n+6 | n+5 | n+4 | n+3 | n+2 | n+1 |
|---|---|---|---|---|---|
| 01 | 1 | 00 | 0 | 01 | 1 |

This would basically require two separate tables at even and odd times. To overcome this need, in cases when the filter is symmetric in time, the address at odd times can be reversed and the samples can be taken in the reverse order as explained in the above mentioned Tetsu Sakata et al article, in order to use same table at odd even times. As a result, the size of the memory, for 6 symbols filter span and 4 samples per symbol, is reduced to $2^{1.5 \times 6} \times 4 = 2$ K.

Hereinafter reference will be generally made to 4 samples per symbol and a 6-symbols filter span, but this is only done for illustration purposes and is not a limitation, as different numbers of samples or symbols may be used.

While an important reduction in the size of the memory is thus obtained, it would be desirable to obtain a further reduction, thereby reducing the hardware size and the power requirement. It is therefore a purpose of this invention to provide a $\pi/4$-shift QPSK modulator which has a lower power consumption and a smaller area than any modulator known in the art.

DETAILED DESCRIPTION OF THE INVENTION

The invention relates in general to a method of $\pi/4$-shift QPSK modulation which comprises the steps of: addressing symbols from a Precursor section of a register to a first memory portion and from a Postcursor section of the register to a second memory portion at odd times; and, addressing symbols from the Precursor section to said second memory portion and from said Postcursor section to said first memory portion at even times by using reversed addressing for Postcursor symbols in accessing the said first and second memory portions.

Preferably, the method further comprises the steps of successively incrementing the address indicated by the Precursor section of the register by a number of storing locations equal to said predetermined number of samples, and successively decrementing the address indicated by the Postcursor section of the register by a number of storing locations equal to said predetermined number of samples.

Preferably, the first memory portion and the second memory portion are adapted to Look Up Tables format.

Preferably, the shift register is adapted to comprise n symbols, the Precursor comprises n/2 of said symbols and the Postcursor comprises the remaining n/2 symbols.

Preferably, n is an even number.

Preferably, the method further comprises the steps of: defining a transfer function of the modulator by an array of characteristic coefficients; computing for each possible inputted symbol sequence, a predetermined number of sample values, said sample values being the sum of the products of said symbol sequence multiplied by said coefficients; and, providing an output of said modulator by an addition of the Precursor sum-of-products and Postcursor sum-of-products.

Preferably, the method of the invention further comprises prestoring said sums-of-products in said first memory portion and in said second memory portion.

Preferably, the method further comprises the step of defining an amplitude value of symbols inputted at odd times by combinations of an at least two bits and an amplitude value of symbols inputted at even times by an at least one bit, and feeding the resulting symbols to said shift register.

Preferably, each symbol comprises a number of predetermined samples.

Preferably, the method further comprises assigning one symbol in the Precursor section and one symbol in the Postcursor section as sign symbols to said sections correspondingly; and, forming the address to the corresponding memory portion from the symbols coming from the corresponding register in accordance with the sign of said sign symbols.

Preferably, each of said sign symbols is selected from the symbols represented by one bit.

Preferably, the method further comprises: when a sign bit is negative, forming the address to the corresponding memory portion from all symbols coming from the corresponding register section except the sign symbol, reversing the sign of each symbol in the corresponding register section, and further reversing the sign of the outputs from the corresponding memory portion; and, otherwise forming the address to the corresponding memory portion from all symbols coming from the corresponding register section except the sign symbol.

Preferably, the first and second memory portions are integrated in a single memory unit.

The invention further relates to a $\pi/4$-shift QPSK modulator which comprises: at least one shift register comprises at least one Precursor section and at least one Postcursor section; and, at least one address convertor which is adapted to convert the symbols from the Precursor section of said register alternately to a first and a second memory portions and from the Postcursor section of said register alternately to said second and first memory portions.

Preferably the modulator further comprises: at least one counter adapted to increment and decrement the least significant bits of the address; a plurality of multiplexers adapted to select the Precursor section of the register to form an address to one memory portion, and the Postcursor section of the register to form an address to the second memory portion, while reversing the order of the Postcursor symbols, said selection is alternated at even and odd times.

Preferably, the modulator further comprises: at least one adder adapted to add a data outputted from said first memory portion to a data outputted from said second memory portion; and at least one digital to analog converter adapted to convert the combined output to an analog output.

Preferably, the said second memory portion is adapted to integrate with unused memory locations of said first memory portion.

Preferably, the addresses in the memory are defined by a high address factor—Most Significant Bits, which are formed by symbols in the register, and by a low address factor-Least Significant Bits, which generates in accordance with the order of sampling within the symbol.

Preferably, the low address factor is provided by said counter.

Preferably, the at least one address converter comprises a plurality of multiplexers and gates for providing Most Significant Bits from the Precursor section into the first or second memory portion, and from the Postcursor section to the second or first memory portion accordingly.

Preferably, the at least one counter which is adapted to provide the Least Significant Bits of the address comprises an oversampling counter.

Preferably, the modulator further comprises a bits to symbols conversion unit for converting a sequence of bits into a sequence of symbols represented alternately by one and two bits.

Preferably, the said shift register is adapted to receive said sequence of symbols.

Figure 2:
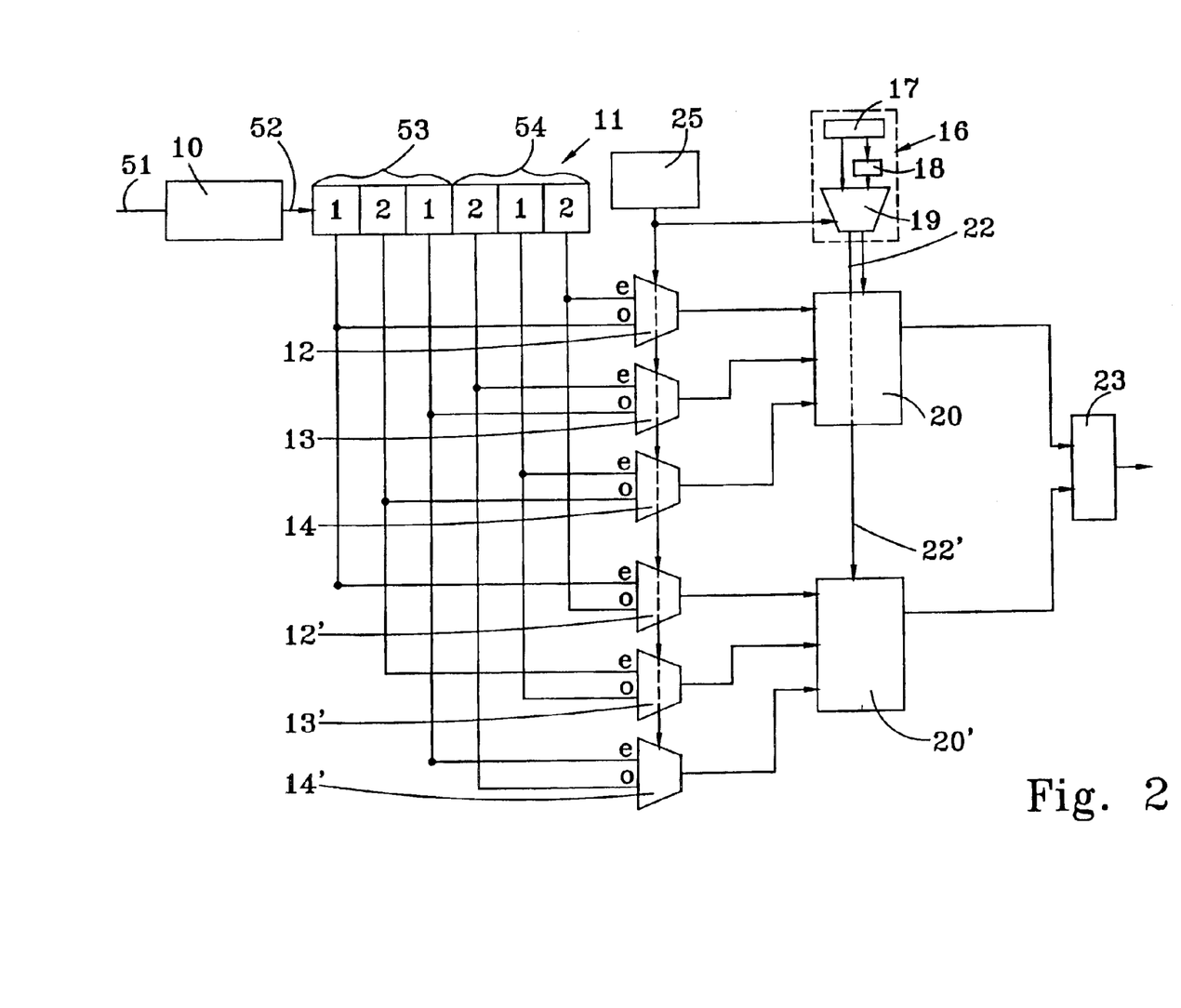
FIG. 2 is a block diagram of a QPSK modulator according to an embodiment of the invention.
Figure 3:
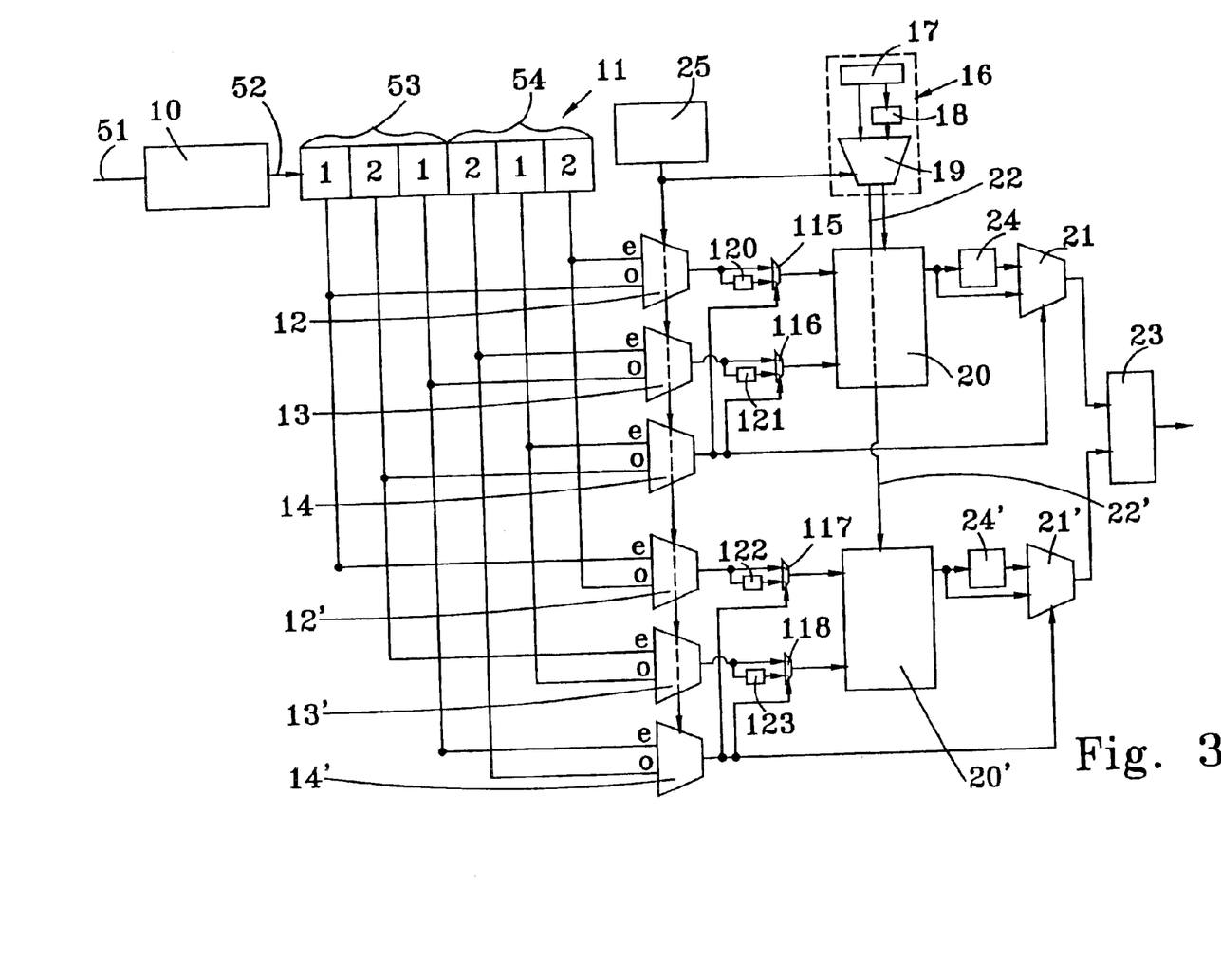
FIG. 3 is a block diagram of a QPSK modulator according to another embodiment of the invention.
Figure 4:
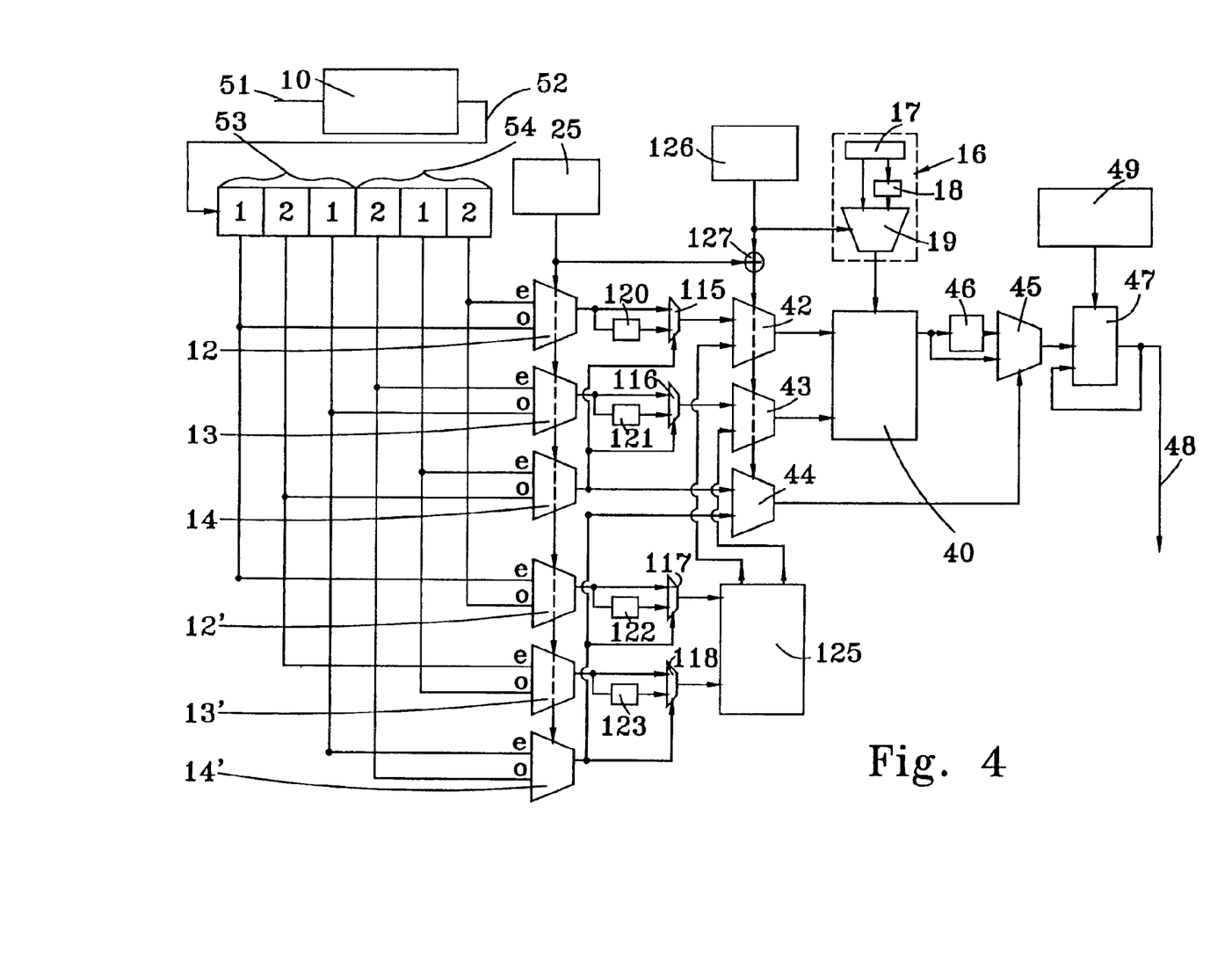
FIG. 4 is a block diagram of a QPSK modulator according to still another embodiment of the invention.

It should be noted that the block diagrams of FIGS. 2, 3 and 4 are fully adequate structurally to define the modulator of the invention, since all the components thereof, separately considered, are well known in the art and easily provided by skilled persons.

FIG. 2 illustrates one embodiment of the invention in which two tables are used, and all the bits of the Precursor and Postcursor serve as address lines to these tables. FIG. 3 illustrates another embodiment of the invention having two tables in which one bit of the Precursor and Postcursor, serves as a sign bit of the input sequence, and according to which the sign of the output of each table is set. This provides a reduction of the tables size of FIG. 3 by a factor of 2 relative to the tables of FIG. 2. FIG. 4 illustrates still another embodiment of the invention having only one condensed table holding the values of both of the tables used in FIG. 3.

In the embodiment of FIG. 2, numeral 10 indicates a bit-to-phases converter, into which the bits are fed, as indicated at 51, and from which the converted signals issue with an odd/even representation, as indicated at 52. 11 indicates an I or Q shift register. Register 11 comprises a Precursor section 53 and a Postcursor section 54, the inputted symbols successively passing through the first and then through the second. The said sections are schematically illustrated for the case of a 6-symbols span. While Precursor and Postcursor could be structurally separated, it is preferred that they constitute a single register unit, but they are functionally dealt with as separate. The register receives alternatively, at odd and even times, respectively, two-bits and one-bit signal values, and therefore the separation of the register into Precursor and Postcursor sections is not rigid, i.e., in a six symbol register at an even time the Precursor may constitute 4 bits and the Postcursor 5 bits, and at the odd time the Precursor constitutes 5 bits and the Postcursor 4 bits. The size of the said two sections is therefore alternatively changes between 4 and 5 bits. The total size of the register remains the same (9 bits in this example) in all cases. In FIG. 2 the numbers shown in register 11 cells indicate the number of bits in the register for even times.

The register outputs are provided as an address to the look-up tables. In the look-up table, for each register address, a predetermined number of sample values are stored in consecutive locations. An address system is therefore provided, wherein each register's content, the high addresses or most significant bits (MSB), are provided by Muxes and the sample values addresses, least significant bits (LSB), are provided by an oversampling counter 16, to be described later.

Control 25 is a toggling Flip Flop to select between even and odd times. Muxes 12–12', 13–13' and 14–14' read the content of register 11 in odd and even times in a succession established by control 25, in the direct order from the Precursor section 53 and in reverse order from the Postcursor section 54, and determine the high address MSB for access to LUTs 20 and 20'. The LUTs store the sums-of-products, $V_i$ of formula (1), as hereinbefore explained Both LUTs output the corresponding sums-of-products, indicated above as $V_i$. An oversampling counter, generally indicated at 16, including a time counter 17, a 2's complement 18, and a Mux 19, determines the low addresses (LSB) for access to the LUTs. Counter 16 sets the LSB address lines of the Precursor section to increment, while the LSB address lines of the Postcursor decrements. Adder 23 sums the data received from tables 20–20', to produce the final output of the filter.

In the embodiment of FIG. 2, the memory of the sums-of-products $V_i$ is shown to obtain address lines from all the bits of the Precursor and Postcursor. As hereinbefore explained, in another embodiment of the invention one of the bits of the Precursor and the Postcursor can serve as a sign of the input sequence, and set the sign of the output of the tables. Such an embodiment is illustrated in FIG. 3, wherein the components that are the same as in FIG. 2 are indicated by the same numerals. In FIG. 3 the output of Muxes 14–14' serve as the above sign bits. If a bit has the negative sign, Muxes 14 and 14' detect it and the sign of the input sequence serving as an address to the LUT is reversed through the 2's complement unit 120, 121, 122, and 123, selected through Muxes 115, 116, 117 and 118. Muxes 14 and 14' also transfer the negative sign to Muxes 21 and 21', whereby to cause the reversal of the sign of the LUT outputs through the 2's complement unit 24 and 24'.

In the embodiments of FIGS. 2 and 3, the memory of the sums-of-products $V_i$ comprises two LUTs, 20 and 20'. As hereinbefore explained, in still another embodiment of the invention only one LUT may be used for odd and even times, which LUT combines the entries of both the LUTs of FIG. 3. Such an embodiment is illustrated in FIG. 4, wherein the components that are the same as in FIG. 3 are indicated by the same numerals. A single LUT 40 is provided, and a modification with respect to the embodiment of FIG. 3 is introduced as to the access to the contents of LUT 40. Once again, the addresses are defined by high addresses MSB and low addresses LSB. However, when a new symbol is inputted, two accesses are performed to Table 40, one for precursor value, then for postcursor value. Unit 126 is a toggle Flip-Flop which designates first/second access, and also indicates the same to Mux 19 of the oversampling counter, for selecting incrementing/decrementing of the same as for purposes as hereinbefore explained. Control 25 designates odd/even times, and X-OR 127 provides proper selections accordingly to Muxes 42, 43, and 44. The first access provides the value previously stored in the Table 20 of FIG. 3. This is done by the fact that Muxes 42, 43 and 44 select the outputs of Muxes 115, 116 and 14 as the MSB of the address to Table 40 for the first access. The second access provides the value previously stored in Table 20' of FIG. 3. This is done by the fact that Muxes 42, 43 and 44 select the outputs of Muxes 117, 118 and 14' as the MSB of the address to Table 40 for the second access. Since table 40 contains values of both table 20 and table 20' of FIG. 3, through the mechanism explained above, Muxes 42, 43 and 44, cause the selection of previously empty places of LUT 20 of FIG. 3, now containing values previously stored in table 20', to be addressed. Element 125 is a logical converter that converts addresses of table 20' of FIG. 3 to empty addresses in table 20 through the use of the value 10 which is not used for 2 bits symbols as explained above. Mux 44 also transfers the sign, received from Mux 14 or 14', to Mux 45, which has the same function as Muxes 21 and 21' in the preceding embodiment. The 2's complement unit 46 serves the same function as the similar units 24 and 24' of FIG. 3. The outputs of Mux 45 are added by adder 47 for the said two accesses to table 40, from which the final output of the modulator issues, as indicated at 48. Zeroing means 49 are provided for zeroing the adder at the beginning of the operation.

It is seen that, according to the invention, the shift register is conceptually (or, if desired, structurally) divided into a Precursor and a Postcursor as shown in FIGS. 2 and 3. If, for example the filter length is 6 symbols, the Precursor will utilize 3 of those symbols, and the Postcursor will utilize the other 3. The Precursor and Postcursor are computed separately, using time reversed samples for the Postcursor, and the results are added. Thus, assuming a 6-symbol span and 4 samples/symbol, designated by the index i=1,3,5,7, and using the notation of index j=8−i, the output is given by:
Out[nT+iT/8]=In[(n·2)T]×H[2T+iT/8]+In[(n−1)T]×H[T+iT/8]+In[nT]×H[iT/8]+In[(n+1)T]×H[(8−i)T/8]+In[(n+2)T]×H[T+(8−i)T/8]+In[(n+3)T]×H[2T+(8−i)T/8)=In[(n−2)T]×H[2T+iT/8]+In[(n−1)T]×H[T+iT/8]+In(nT]×H[iT/8]+In[(n+1)T]×H[jT/8]+In[(n+2)T]×H[T+jT/8]+In [(n+3)T]×H[2T+jT/8]

Wherein n is the symbol index and i is the samples index.

The terms in which the index i occurs define the contribution of the Precursor, and those in which the index j occurs define the contribution of the Postcursor. Addition of the results for all the values of i and j, viz. for both the Precursor and the Postcursor, gives the output resulting from all 6 symbols. It is also clear from the above formula, why the Postcursor uses reversed addressing to the tables, and decreasing sample index.

If the number of symbols is N and N/2 is an odd number, the Precursor has a different address meaning (and length) at even times and at odd times, as follows:

Odd times

| A | bc | d |
|---|----|---|
| 1 | 01 | 0 |

Even times

| Ef | g | hi |
|----|---|----|
| 11 | 0 | 01 | without loss of generality we can assume that the first row above relates to odd times and the second row to even times. Two separate LUTs are needed then for odd and even times. The Postcursor uses the same tables at alternate times, with time reversed samples. The total LUT size for a 6 symbols filter span and 4 samples per symbol is $(2^5+2^4) \times 4=192$.

A preferred embodiment of the method of the invention uses symmetry for negated input and expresses negated input by the two's-complement system; and, in a preferred embodiment of the modulator of the invention, which carries out said embodiment of the method, 1 address bit is reduced and 2's complement inverter means are added, thus further reducing the total LUT size to $(2^4+2^3) \times 4=96$, at the cost of an extra 2's complement converter, which is a very simple device.

In a further preferred embodiment of the invention, since the LUTs are sparse, the empty entries in one LUT can be used to receive the entries of the other LUT. Since some of the symbols are represented by 2 bits, but obtain only three possible values (00, 01, 11), the extra value, namely 10, which previously holds an empty entry in LUT1, is used to hold values that would otherwise reside in the LUT2. The two LUT means remain functionally distinct, but are condensed in a single LUT. Two separate accesses must then be provided, but the number of gates can be reduced.

It should be noted that the addresses in the LUTs are identified by two factors: the first (herein indicated by the abbreviation MSB) are the symbols themselves, and is referred to as "high address"; the second is the sample index within the symbol (herein indicated by the abbreviation LSB), and is referred to as "low address". MSB and LSB together determine the addresses in the LUTs. Referring to the above example, the address of one table is comprised of (a,bc,d), while the address of the second table comprises of (ef,g,hi), where a,d,g hold 1 bit values (0 or 1) and bc,ef,hi hold 2 bit values (00,01,11), while the value 10 is not used. When d equals 0, the address (a,bc,d) uses the empty entry (10,a,bc) in the single LUT. When d equals 1, the address (a,bc,d) uses the empty entry (bc,a,10) in the single LUT.

Figure 5:
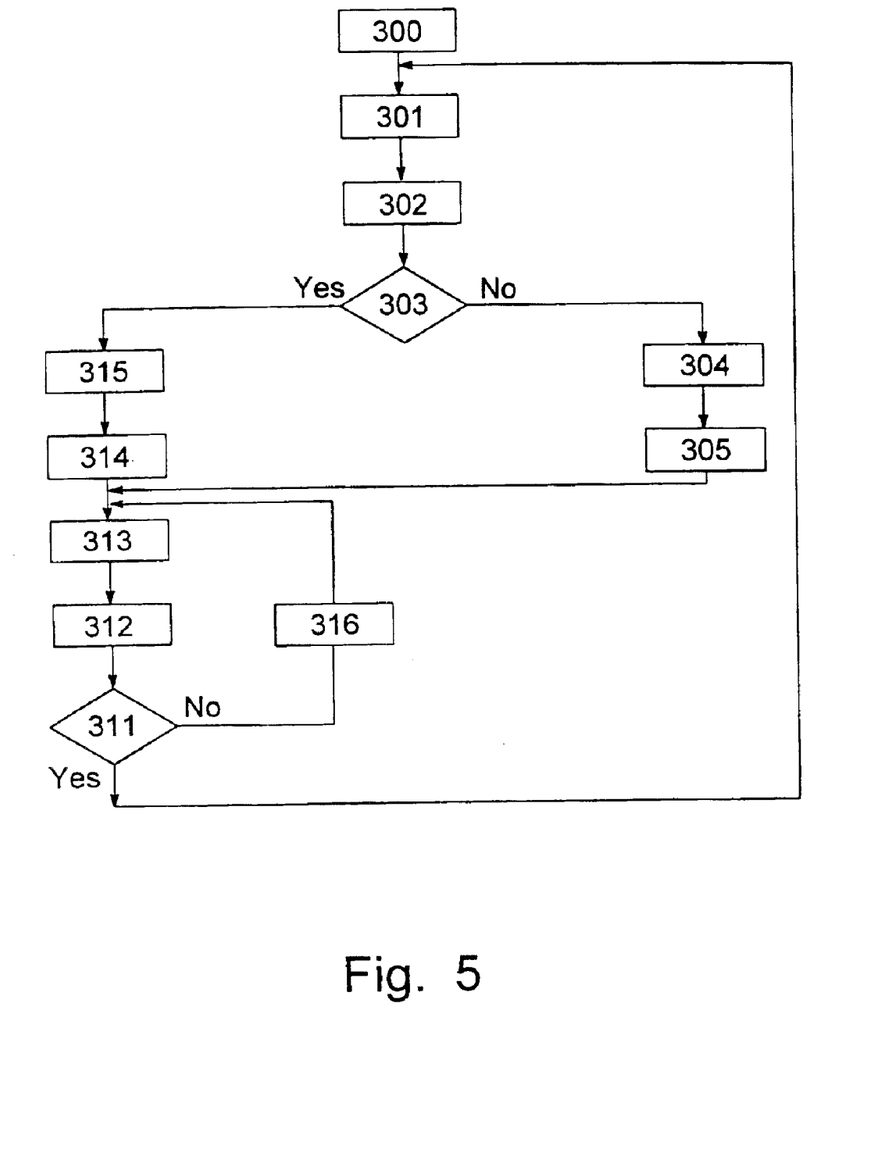
FIGS. 5, 6 and 7 are flow diagrams of the embodiments of FIGS. 2, 3 and 4, respectively.

FIG. 5 is a flow diagram showing the operation of a modulator using two LUTs, such as the one illustrated in FIG. 2. In the flow chart, only the (I) channel is described, since the (O) channel is parallel and identical. The diagram refers to a 6-symbol example.

Initially, in step 300 it is assumed that the operation starts at even timing. In step 301, a next symbol is entered into register 10, one bit at odd times, two bits at even times, and the oldest symbol in the register is withdrawn. The sample counter is then set to "1" in step 302. In step 303, a check is made whether the time is even or odd. If the time is odd, the bit contents of symbols 1, 2, 3 in register 11 are used as the high address lines for addressing table 20'. (Symbol 1 is the symbol first entered to the register, i.e., the rightmost in the figure, and symbol 6 is the last one, i.e., the leftmost). At the same (odd) time, in step 305 symbols 4, 5, 6 are used as the high address lines for addressing table 20. If the time is even in step 303, symbols 1, 2, 3 are used as high address lines for addressing table 20 (in step 315), and in the same (even) time, in step 314 symbols 4, 5, 6 are used as high address lines for addressing table 20'.

The outputs from the oversampling counter 16 are used as the low address lines for addressing table 20, and after inversion, as low address lines for addressing table 20' (step 313). While the oversampling counter 16 is incremented, the data in the corresponding locations of table 20 and 20' is outputted and added by adder 23 (step 312). In step 311 a check is made whether the last sample of the symbol as determined by the oversampling counter 16 has been reached. If the answer is yes, the process returns to step 301, otherwise, the oversampling counter is incremented (in step 316), and a return is made to step 313.

Figure 6:
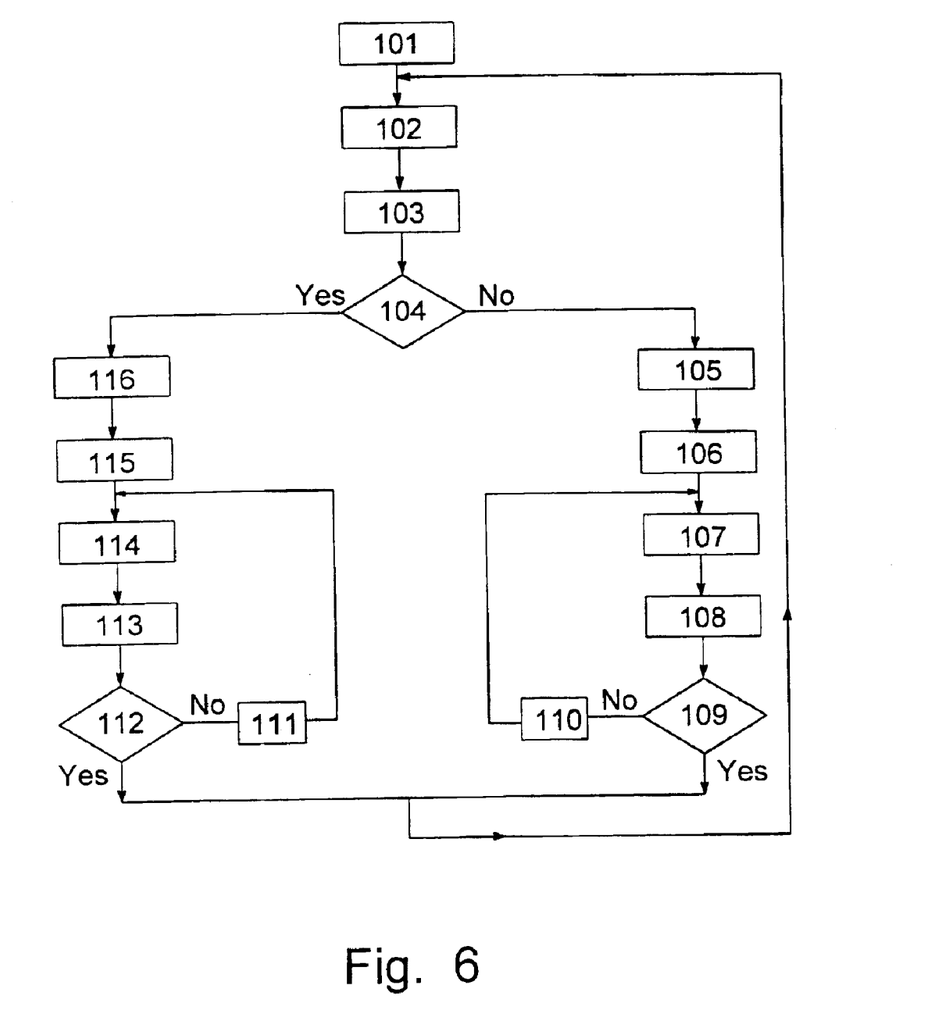

FIG. 6 is a flow diagram illustrating the operation of a modulator using two LUTs, such as illustrated in FIG. 3. In the flow diagram, only the (I) channel is described, since the (Q) channel is parallel and identical. The diagram refers to a 6-symbol example.

Initially, in step 101 it is assumed that the operation starts at even timing. In step 102, a next symbol is entered into register 10, one bit at odd times, two bits at even times, and the oldest symbol in the register is withdrawn. The oversampling counter 16 is then set to "1" in step 103. In step 104, a check is made whether the time is even. If the time is odd, the bit contents of symbols 1, 2, 3 in register 11are used as high address lines for addressing table 20', while symbol 1 is used as the sign (Symbol 1 is the symbol first entered to the register, i.e., the rightmost in the figure, and symbol 6 is the last one, i.e., the leftmost). At the same (odd) time, in step 106 symbols 4, 5, 6 are used as high address lines for addressing table 20, while symbol 5 is used as the sign. The oversampling counter 16 is now incremented, while its outputs are used as low address lines for addressing table 20', and after inversion, as low address lines for addressing table 20 (step 107). In step 108 the data from the corresponding locations of tables 20 and 20' as addressed, is added by adder 23, while the sign is the symbol sign. The result of the adding operation is outputted. In step 109 a check is made to verify whether the last sample of the symbol as determined by the oversampling counter 16 has been reached. If not, the oversampling counter 16 is incremented, and a return is made to step 107.

If however, the time in step 104 is even, in step 116 the bit contents of symbols 1, 2, 3 of register 11 are used as high address lines for addressing table 20, while symbol 2 is used as the sign (Symbol 1 is the symbol first entered to the register, i.e., the rightmost in the figure, and symbol 6 is the last one, i.e., the leftmost). At the same (even) time, in step 115 symbols 4, 5, 6 are used as high address lines for table 20', while symbol 4 is used as the sign. The outputs of the oversampling counter 16 are used as low address lines for addressing table 20, and same outputs after inversion are used as low address lines for addressing table 20' (step 114). In step 113 the data of the corresponding locations of table 20 and table 21 as addressed is added by adder 23, while the sign is the symbol sign. The adding result is treated as the output. In step 112 a check is made whether the last sample of the symbol as determined by the oversampling counter 16 has been reached. If not, the oversampling counter 16 is incremented in step 111, and a return is made to step 114. If however, the last sample has been reached in step 112, the process returns to step 102.

Figure 7:
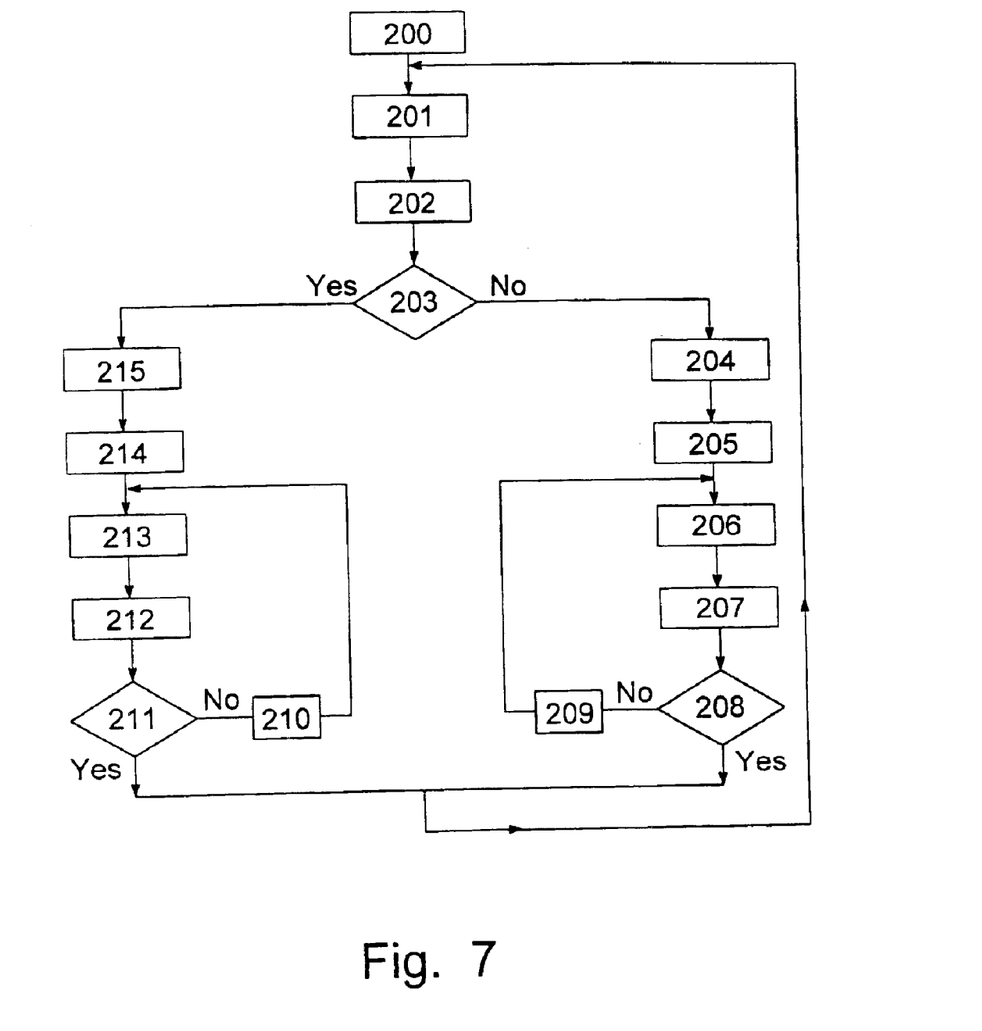

FIG. 7 is a flow diagram similar to that of FIGS. 5 and 6, illustrating the operation of a modulator using a single LUT, as illustrated in FIG. 4. In this case as well, only the (I) channel is described, since the (Q) channel is parallel and identical, the diagram refers to a 6-symbol example, and only the (I) channel is described.

Initially, in step 200 it is assumed that the operation starts at even timing. In step 201, a next symbol is entered into register 11, one bit at odd times, two bits at even times, and the oldest symbol in the register is withdrawn. The oversampling counter 16 is then set to "1" in step 202. In step 203, a check is made whether the time is even. If the time is odd, in step 204 the bit contents of symbols 1, 2, 3 in register 11 are used as high address lines for addressing table 40 in a first access, while symbol 1 is used as the sign (Symbol 1 is the symbol first entered to the register, i.e., the rightmost in the figure, and symbol 6 is the last one, i.e., the leftmost). The bit content of symbols 2 and 3 are converted to four address lines, for exploiting the empty locations originally existed in table 20 of the embodiments of FIGS. 2 and 3. In step 205, the bit contents of symbols 4,5, and 6 in register 10 are used as high address lines for addressing table 40, for a second access to the table, while symbol 5 is used for the sign. In step 206, the outputs of the oversampling counter 16 are used as low address lines for addressing table 40 in the first access, and in the second access, the outputs are converted and used as low address lines for addressing table 40. In step 207 the result from the first access to table 40, is added by adder 47 to the result of the second access to the table 40, while the sign of each result is determined by the corresponding sign symbol. The addition result is treated as the output. In step 208 a check is made whether the last sample of the symbol as determined by the oversampling counter 16 has been reached. If not, the oversampling counter 16 is incremented in step 209, and a return is made to step 206. If however the last sample has been reached in step 208, the process returns to step 201.

If in step 203 the time is even, in step 215 the bit contents of symbols 1, 2, 3 in register 11 are used as high address lines for addressing table 40 in a first access, while symbol 2 is used as the sign. In step 214, the bit contents of symbols 4,5, and 6 in register 11 are used as high address lines for addressing table 40 in a second access to the table, while symbol 4 is used as the sign. The contents of symbols 5 and 6 are converted to four address lines, for exploiting the empty locations originally existed in table 20 of the embodiments of FIGS. 2 and 3. In step 213, the outputs from the oversampling counter 16 are used as low address lines for addressing table 40 in the first access, and in the second access they are first converted and then treated as low address lines for addressing table 40. In step 212 the result from the first access to table 40 from an address consisting of high and low address lines is added by adder 47 to the result of the second access to the table 40 from an address consisting of low and high address lines, while the sign of each result is determined by the corresponding sign symbol. The addition result is treated as the output. In step 211 a check is made whether the last sample of the symbol as determined by the oversampling counter 16 has been reached. If not, the oversampling counter is incremented in step 210, and a return is made to step 213. If however the last sample has been reached in step 211, the process returns to step 201.

As has been said the size of the LUTs according to this invention is considerably smaller than that of the prior art LUTs. The following examples illustrate this fact. S is the size of the LUT or the combined size of LUT1 and LUT2, Nsy the number of symbols spanned, and Nsa the number of samples per symbol.

In the embodiment of FIG. 2:
if Nsy is a multiple of 4, $S=2^{[1.5 X Nsy/2]} X Nsa$
if Nsy is not a multiple of 4, $S=(2^{[1.5 X Nsy/2+0.5]}+2^{[1.5 X Nsy/2-0.5]}) X Nsa$.

In the embodiment of FIG. 3:
if Nsy is a multiple of 4, $S=2^{[1.5 X Nsy/2-1]} X Nsa$
if Nsy is not a multiple of 4, $S=(2^{[1.5 X Nsy/2-0.5]}+2^{[1.5 X Nsy/2-1.5]}) X Nsa$.

In the embodiment of FIG. 4, if Nsy is not a multiple of 4, $S=2^{[1.5 X Nsy/2-0.5]} X Nsa$.

If Nsy is a multiple of 4 tables 20 and 20' of FIG. 3 are already identical, and thus to incorporate them in a single table, takes no effort, only accessing the same table with twice the speed.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method of π4-shift QPSK modulation comprising:
   providing a portion of an address in a direct order from a Precursor section of a register to a first memory portion and in a reversed order from a Postcursor section of said register to a second memory portion at odd times; and
   providing said portion of the address in the direct order from said Precursor section to said second memory portion and in the reversed order from said Postcursor section to said first memory portion at even.

2. The method of claim 1, further comprising:
   successively incrementing the portion of the address indicated by the Precursor section of the register by a number of storing locations according to a predetermined number of samples, and successively decrementing the address indicated by the Postcursor section of the register by a number of storing locations according to said predetermined number of samples.

3. The method of claim 2, wherein the first memory portion and the second memory portion are adapted to Look Up Tables format.

4. The method of claim 3 comprising:

adapting the register to include n symbols wherein the Precursor includes n/2 of said n symbols and the Postcursor includes n/2 of said n symbols.

5. The method of claim 4, further comprising:

defining a transfer function of the modulator by an array of characteristic coefficients;

computing for a possible inputted symbol sequence, a predetermined number of sample values, said sample values being the sum of the products of said symbol sequence multiplied by said coefficients; and providing an output of said modulator by an addition of the Precursor sum-of-products and Postcursor sum-of-products.

6. The method of claim 5, comprising:

storing said sums-of-products said first memory portion and said second memory portion.

7. The method of claim 6, comprising:

defining an amplitude value of symbols inputted at odd times by combinations of an at least two bits and an amplitude value of symbols inputted at even times by an at least one bit, and feeding the resulting symbols to said register.

8. The method of claim 1, further comprising:

assigning one symbol in the Precursor section and one symbol in the Postcursor section as sign symbols to said sections correspondingly; and forming the address to the corresponding memory portion from the symbols coming from the corresponding register in accordance with the sign of said sign symbols.

9. The method of claim 1 comprising: selecting from the symbols represented by one bit a sign symbol.

10. The method of claim 9, further comprising:

when a sign bit is negative, forming the address to the corresponding memory portion from all symbols coming from the corresponding register section except the sign symbol, reversing the sign of each symbol in the corresponding register section, and further reversing the sign of the outputs from the corresponding memory portion;

otherwise forming the address to the corresponding memory portion from all symbols coming from the corresponding register section except the sign symbol.

11. The method of claim 10 comprising integrating the first and second memory portions in a single memory unit.

12. An π/4-shift QPSK modulator comprising:

a register having a Precursor section to provide a first portion of an address in a direct order to a first memory portion and a Postcursor section to provide a second portion of the address in a reveres order to a second memory portion; and control to alternate the first and second portions of the address provided by the Precursor section and the Postcursor section of said register to the first and second memory portions according to even and odd times.

13. The modulator of claim 12, further comprising:

a counter to increment and decrement a least significant bits of the address; and two or more multiplexers to select outputs of the Precursor section of the register to form the first portion of the address to the first memory portion, and the Postcursor section of the register to form the second portion of the address to the second memory portion, while reversing the order of the Postcursor symbols, said selection is alternated at even and odd times.

14. The modulator of claim 13, further comprising:

an adder to add a data outputted from said first memory portion to a data outputted from said second memory portion; and a digital to analog converter to convert the combined output to an analog output.

15. The modulator of claim 13, wherein said second memory portion to integrate with unused memory locations of said first memory portion.

16. The modulator of claim 13, wherein the first and second portions of the addresses most significant bits, being formed by symbols in the register, and a third portion of the address is least significant bits, which generates in accordance with the order of sampling within the symbol.

17. The modulator of claim 16 wherein, said least significant bits are provided by said counter.

18. The modulator of claim 13 wherein, said counter is adapted to provide the least significant bits includes an over sampling counter.

19. The modulator of claim 13, further comprising:

a bits to symbols conversion unit for converting a sequence of bits into a sequence of symbols represented alternately by one and two bits.

20. The modulator of claim 19, wherein said register is adapted to receive said sequence of symbols.

* * * * *